United States Patent
Klomsdorf et al.

(10) Patent No.: US 10,972,145 B1
(45) Date of Patent: Apr. 6, 2021

(54) METHOD FOR ANTENNA SELECTION FOR CONCURRENT INDEPENDENT TRANSMISSIONS VIA MULTIPLE ANTENNAS

(71) Applicant: MOTOROLA MOBILITY LLC, Chicago, IL (US)

(72) Inventors: Armin Klomsdorf, Chicago, IL (US); Dale Schwent, Schaumburg, IL (US); Brian H. Bremer, Arlington Heights, IL (US)

(73) Assignee: Motorola Mobility LLC, Chicago, IL (US)

( * ) Notice: Subject to any disclaimer, the term of this patent is extended or adjusted under 35 U.S.C. 154(b) by 0 days.

(21) Appl. No.: 16/894,793

(22) Filed: Jun. 6, 2020

(51) Int. Cl.
| | |
|---|---|
| *H04B 1/525* | (2015.01) |
| *H04B 1/10* | (2006.01) |
| *H04B 3/52* | (2006.01) |
| *H01Q 21/28* | (2006.01) |
| *H01Q 1/24* | (2006.01) |
| *H04B 1/18* | (2006.01) |

(52) U.S. Cl.
CPC ............ *H04B 1/525* (2013.01); *H01Q 1/243* (2013.01); *H01Q 21/28* (2013.01); *H04B 1/109* (2013.01); *H04B 1/18* (2013.01); *H04B 3/52* (2013.01)

(58) Field of Classification Search
CPC ...... H04B 1/04; H04B 1/0475; H04B 1/0483; H04B 1/006; H04B 1/0064; H04B 1/10; H04B 1/1027; H04B 1/109; H04B 1/16; H04B 1/18; H04B 1/38; H04B 1/40; H04B 1/44; H04B 1/48; H04B 1/525; H04B 7/0602; H04B 7/0802; H04B 15/00; H04B 1/50; H04B 3/52; H01Q 1/24; H01Q 1/244; H01Q 1/246; H01Q 21/245; H01Q 21/26; H01Q 21/28; H01Q 1/241; H01Q 1/242

See application file for complete search history.

(56) References Cited

U.S. PATENT DOCUMENTS

| | | | | |
|---|---|---|---|---|
| 8,958,760 | B2 * | 2/2015 | Mujtaba | H04B 1/04 455/103 |
| 9,287,953 | B2 * | 3/2016 | Ngai | H04B 1/44 |
| 9,864,087 | B2 * | 1/2018 | Komulainen | H04B 1/3838 |
| 10,067,171 | B2 * | 9/2018 | O'Keeffe | H04B 1/0483 |
| 10,454,504 | B2 * | 10/2019 | Notargiacomo | H04B 1/525 |
| 10,715,231 | B1 * | 7/2020 | Daugherty | H04B 1/48 |

* cited by examiner

*Primary Examiner* — Quochien B Vuong
(74) *Attorney, Agent, or Firm* — Yudell Isidore PLLC

(57) ABSTRACT

A communication device has a controller that selects one of a second antenna and at least one alternate second antenna for concurrent transmission with a first antenna. The controller monitors concurrent communication activity of the first and the second transmitter. Based on the concurrent communication activity, the controller identifies respective transmit power limits associated with intermodulation distortion (IMD) for the first antenna transmitting at the first transmit frequency and one of the second antenna and the at least one alternate second antenna transmitting at the second transmit frequency and having respective antenna isolation levels to the first antenna. The controller identifies, available total radiated power (TRP), respectively, for the second antenna and the at least one alternate second antenna and connects the second transmitter to one of the second antenna and the at least one alternate second antenna having the highest available TRP to optimize communication performance.

20 Claims, 7 Drawing Sheets

METHOD FOR ANTENNA SELECTION FOR CONCURRENT INDEPENDENT TRANSMISSIONS VIA MULTIPLE ANTENNAS

TECHNICAL FIELD

The present disclosure relates generally to communication devices and methods for concurrent transmission on closely positioned antennas, and more particularly to communication devices and methods for mitigating intermodulation distortion (IMD) caused by concurrent transmission.

DESCRIPTION OF THE RELATED ART

Developments in communication devices increasingly include concurrent transmission via antennas that are in close proximity. For example, in moving from fourth generation long term evolved (LTE) radio access technology (RAT) to fifth generation new radio (5G NR) RAT, communication devices typically have seen an increase in a number of transmit paths that operate simultaneously. A typical LTE communication device has a maximum of two transmitters that are simultaneously active, one LTE transmitter and one Wi-Fi transmitter. A 5G NR communication device can have up to two 5G NR transmitters in multiple input multiple output (MIMO) operation, one LTE transmitter, and two Wi-Fi transmitters in MIMO operation. 5G non-standalone (NSA) mode is an option for 5G NR deployment. NSA mode is also referred to as evolved UTMS radio access network and new radio dual connectivity (ENDC) or merely "dual connectivity". Dual connectivity refers to possible concurrent transmission by an LTE transmitter and by a 5G NR transmitter. The potential for negative interactions between these transmitters increases with the increased number of transmitters.

Conventionally, for concurrent transmission, communication devices select antennas individually that are determined to provide optimal radiation efficiency in the selected frequency band. However, the simultaneous transmission by multiple transmitters gives rise to negative interactions that include: (i) intermodulation distortion (IMD) products between transmitters that fall in active receive bands, causing self-desensitization that results in degradation of overall data transfer throughput; (ii) IMD products between transmitters that fall outside of receive bands of the communication device but result in spurious emissions levels above those permissible by standards bodies for maximum sensitivity degradation (MSD) and other communication regulations; and (iii) radio frequency (RF) radiation exposure to a human body that is above a regulatory limit. For frequencies below 6 GHz, the RF radiation exposure limits are defined for specific absorption rate (SAR). For frequencies above 6 GHz, the RF radiation exposure limits are defined for power density (PD) at the surface since the short wave length attenuates quickly when encountering tissue. The simultaneous transmissions from each transmitter are additive. Increasing the number of transmitters increases the total RF radiation exposure. Currently, these negative interactions are managed by reducing power on one or more of the active transmit paths. Transmit power reduction has the negative consequence of reducing Total Radiated Power (TRP) and therefore reduces range and/or throughput on that transmission path.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

Figure 1:
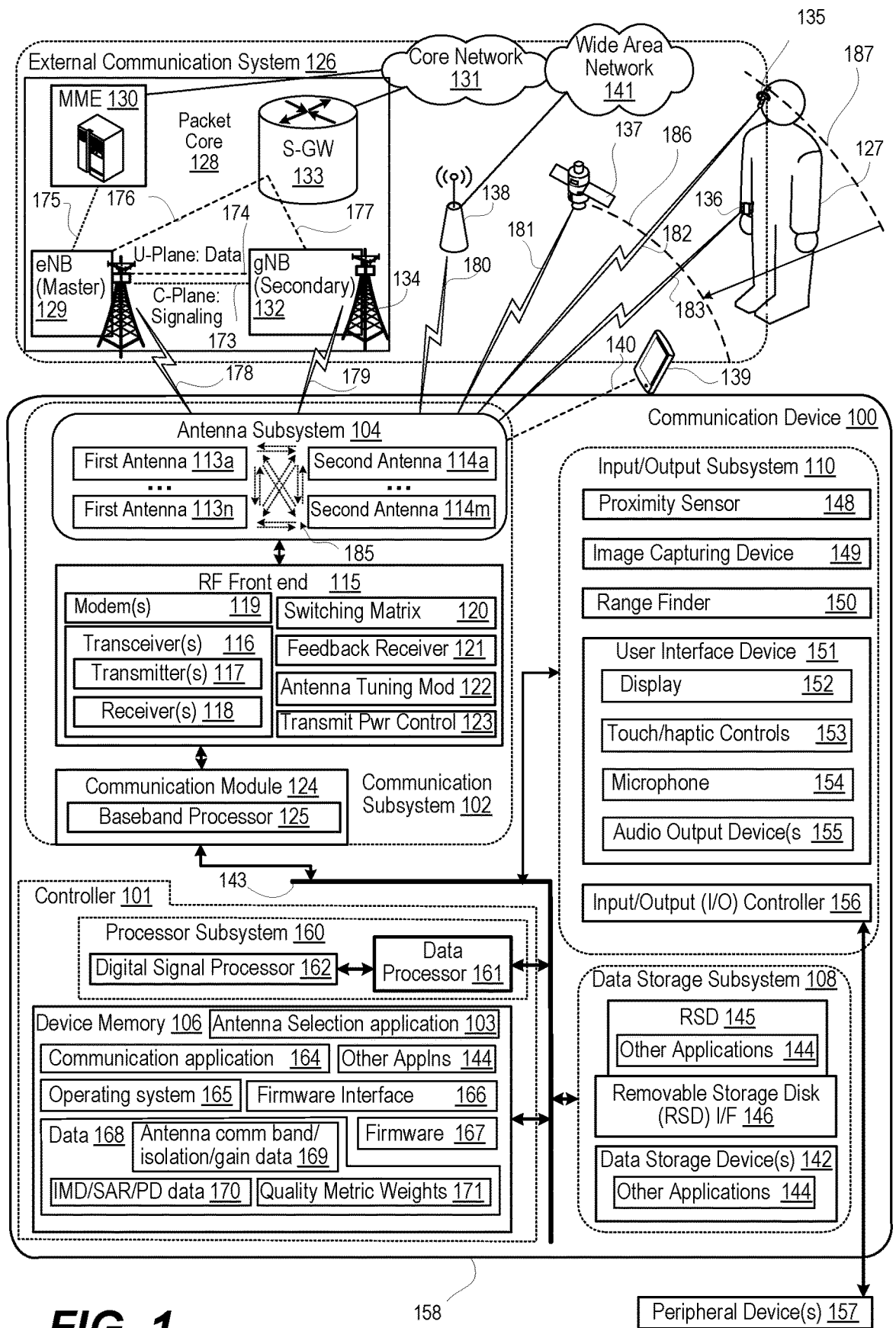
FIG. 1 is a functional block diagram of an electronic device in an operating environment within which the features of the present disclosure are advantageously implemented, according to one or more embodiments.

According to aspects of the present disclosure, a communication device, method, and computer program product provide for antenna selection that optimizes performance by multiple transmitters. In one or more embodiments, the communication device includes a first transmitter that transmits at a first frequency. The communication device includes a first antenna electrically coupled to the first transmitter. The first antenna radiates a first transmit signal at a first total radiated power (TRP). A second transmitter of the communication device generates a second transmit signal at a second frequency. The second antenna has a second antenna efficiency rating (gain) at the second transmit frequency that yields a second TRP. The second antenna has a first antenna isolation level transmitting at the second transmit frequency to the first antenna transmitting at the first frequency The communication device includes at least one alternate second antenna, each having an alternate second antenna efficiency rating (gain) at the second transmit frequency that yields an alternate second TRP. The at least one alternate second antenna has a second antenna isolation level transmitting at the second transmit frequency to the first antenna transmitting at the first frequency. The controller is communicatively coupled to the first and the second transmitter, the at least one receiver, and the antenna switch. The controller monitors concurrent communication activity of the first and the second transmitter and the at least one receiver. The controller identifies, based on the concurrent communication activity, respective transmit power limits associated with intermodulation distortion (IMD) for the first antenna transmitting at the first transmit frequency and one of the second antenna based on the first antenna isolation level and the at least one alternate second antenna based on the second antenna isolation level, both transmitting at the second transmit frequency. The controller identifies, based on the transmit power limits, available TRP, respectively, for the second antenna and the at least one alternate second antenna. The controller configures the antenna switch to connect the second transmitter to one of the second antenna and the at least one alternate second antenna having the highest available TRP.

According to one aspect, the present disclosure optimizes performance in some instances by identifying an alternate second antenna on the communication device that may have a lower efficiency than a second antenna but has improved isolation to a first antenna. The total radiated power (TRP) of the alternate second antenna, even though reduced by lower antenna efficiency, can still be greater than the TRP of the more efficient second antenna. The advantage of the less efficient alternate second antenna is based on the more efficient second antenna requiring a greater power reduction than the alternate second antenna to reduce intermodulation distortion to within a specified limit.

In the following detailed description of exemplary embodiments of the disclosure, specific exemplary embodiments in which the various aspects of the disclosure may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present disclosure. The following detailed description is, therefore, not to be taken in a limiting sense, and the scope of the present disclosure is defined by the appended claims and equivalents thereof. Within the descriptions of the different views of the figures, similar elements are provided similar names and reference numerals as those of the previous figure(s). The specific numerals assigned to the elements are provided solely to aid in the description and are not meant to imply any limitations (structural or functional or otherwise) on the described embodiment. It will be appreciated that for simplicity and clarity of illustration, elements illustrated in the figures have not necessarily been drawn to scale. For example, the dimensions of some of the elements are exaggerated relative to other elements.

It is understood that the use of specific component, device and/or parameter names, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that term is utilized.

As further described below, implementation of the functional features of the disclosure described herein is provided within processing devices and/or structures and can involve use of a combination of hardware, firmware, as well as several software-level constructs (e.g., program code and/or program instructions and/or pseudo-code) that execute to provide a specific utility for the device or a specific functional logic. The presented figures illustrate both hardware components and software and/or logic components.

Those of ordinary skill in the art will appreciate that the hardware components and basic configurations depicted in the figures may vary. The illustrative components are not intended to be exhaustive, but rather are representative to highlight essential components that are utilized to implement aspects of the described embodiments. For example, other devices/components may be used in addition to or in place of the hardware and/or firmware depicted. The depicted example is not meant to imply architectural or other limitations with respect to the presently described embodiments and/or the general invention.

The description of the illustrative embodiments can be read in conjunction with the accompanying figures. Embodiments incorporating teachings of the present disclosure are shown and described with respect to the figures presented herein.

FIG. 1 is a functional block diagram of an electronic device in an operating environment within which the features of the present disclosure are advantageously implemented. In particular, communication device 100, managed by controller 101, is an example of an electronic device having communication subsystem 102 that concurrently communicates on multiple transmission paths. According to one aspect of the disclosure, controller 101 executes antenna selection application 103, which optimizes performance of antenna subsystem 104 during concurrent transmissions. Communication device 100 can be one of a host of different types of devices, including but not limited to, a mobile cellular phone, satellite phone, or smart-phone, a laptop, a net-book, an ultra-book, a networked smart watch or networked sports/exercise watch, and/or a tablet computing device or similar device that can include wireless communication functionality. As a device supporting wireless communication, communication device 100 can be utilized as, and also be referred to as, a system, device, subscriber unit, subscriber station, mobile station (MS), mobile, mobile device, remote station, remote terminal, user terminal, terminal, user agent, user device, a Session Initiation Protocol (SIP) phone, a wireless local loop (WLL) station, a personal digital assistant (PDA), computer workstation, a handheld device having wireless connection capability, a computing device, or other processing devices connected to a wireless modem.

Referring now to the specific component makeup and the associated functionality of the presented components. In one or more embodiments, communication device 100 includes communication subsystem 102, device memory 106, data storage subsystem 108, and input/output (I/O) subsystem 110. Each subsystem is managed by controller 101. Antenna subsystem 104 of communication subsystem 102 includes first antennas 113*a*-113*n* and second antennas 114*a*-114*m*. In one or more embodiments, first antennas 113*a*-113*n* support lower frequency bands such as ultra-high band (UHB). Second antennas 114*a*-114*m* are array modules (ARMs) that support multiple input multiple output (MIMO) communication in higher frequency bands, such as millimeter Wave (mmWave). Communication subsystem 102 includes RF front end 115 having transceiver(s) 116 that includes transmitter(s) 117 and receiver(s) 118. RF front end 115 further includes modem(s) 119, switching matrix 120, feedback receiver 121, antenna tuning module 122, and transmit power control 123. Communication subsystem 102 includes communication module 124 having baseband processor 125. Baseband processor 125 communicates with controller 101 and RF front end 115.

Communication subsystem 102 communicates with external communication system 126. Baseband processor 125 operates in baseband frequency range to encode data for transmission and decode received data, according to a communication protocol. Modem(s) 119 modulate baseband encoded data from communication module 124 onto a carrier signal to provide a transmit signal that is amplified by transmitter(s) 117. Modem(s) 119 demodulates the received signal from external communication system 126 detected by antenna subsystem 104. The received signal is amplified and filtered by receiver(s) 118, which demodulate received encoded data from a received carrier signal.

Antenna tuning module 122 adjusts antenna impedance of antenna subsystem 104. Antenna tuning module 122 improves antenna efficiency at desired transmit or receive frequencies of transmitter(s) 117 and receiver(s) 118, respectively, within transceiver(s) 116. Antenna tuning module 122 is electrically coupled to antenna subsystem 104 and compensates for any lossy dielectric effect of being proximate to person 127. In one or more embodiments, first antennas 113a-113n and second antennas 114a-114m are individually tuned to selected RF bands to support different RF communication bands and protocols. First antennas 113a-113n and second antennas 114a-114m can be used in combination for multiple input multiple output (MIMO) operation for beam steering and spatial diversity. Subsets of first antennas 113a-113n and second antennas 114a-114m operate independently to support concurrent communication.

External communication system 126 includes packet core 128 that supports data streaming services for communication device 100 via public land mobile networks (PLMNs). Communication device 100 connects wirelessly or over the air (OTA) to evolved base node (eNB) 129 that supports long term evolved (LTE) RAT, which serves as the master node for control signaling and in some instances data transfer. eNB 129 is supported by mobility management entity (MME) 130 for control services such as authentication, connection handoffs, idle mode mobility, etc. MME 130 is a control interface to core network 131. When available and needed, communication device 100 connects wirelessly or OTA with 5G base node (gNB) 132 as the secondary node for data transfer. Control plane (C-plane) signaling occurs between communication device 100, eNB 129, MME 130, and gNB 132. User plane (U-plane) data transfer can occur between communication device 100, eNB 129, gNB 132, and serving gateway (S-GW) 133 of packet core 128. eNB 129 and gNB 132 can be accessed via radio tower(s) 134.

In other applications, external communication system 126 can include localized or personal devices such as wireless headset 135 and smart watch 136. External communication system 126 can also include global positioning system (GPS) satellites 137. External communication system 126 can further include access nodes 138 for wireless communication. External communication system 126 also includes other communication devices 139 that can be affected by spurious emissions 140 that radiate from communication device 100. Communication devices 100, 139 can be provided communication services by one or more wide area networks 141.

Packet core 128 of external communication system 126 has internal communication channels. eNB 129 communicates via a wired or wireless channel 173 with gNB 132 for C-plane signaling. eNB 129 communicates via a wired or wireless channel 174 with gNB 132 for U-plane data transfer. eNB 129 communicates via a wired or wireless channel 175 with MME 130 for C-plane signaling. eNB 129 communicates via a wired or wireless channel 176 with S-GW 133 for U-plane data transfer. gNB 132 communicates via a wired or wireless channel 177 with S-GW 133 for U-plane data transfer.

Communication subsystem 102 communicates with eNB 129 via uplink/downlink channels 178. Communication subsystem 102 communicates with gNB 132 via uplink/downlink channels 179. Communication subsystem 102 communicates with access node 138 via transmit/receive signals 180. Communication subsystem 102 receives satellite broadcast signals 181 from GPS satellites 137. Communication subsystem 102 communicates with wireless headset 135 via transmit/receive signals 182. Communication subsystem 102 communicates with smart watch 136 via transmit/receive signals 183.

In one or more embodiments, controller 101, via communication subsystem 102, performs multiple types of OTA or wireless communication with external communication system 126. Communication subsystem 102 can communicate via Bluetooth connection with one or more personal access network (PAN) devices, such as wireless headset 135 and smart watch 136. Communication via Bluetooth connection includes both transmission and reception via a Bluetooth transceiver device. In one or more embodiments, communication subsystem 102 communicates with one or more locally networked devices via a wireless local area network (WLAN) link provided by access node 138. In one or more embodiments, access node 138 supports communication using one or more IEEE 802.11 WLAN protocols. Access node 138 is connected to wide area network 141, such as the Internet. In one or more embodiments, communication subsystem 102 communicates with GPS satellites 137 to obtain geospatial location information.

Extremely high frequency (EHF) is the International Telecommunication Union (ITU) designation for the band of radio frequencies in the electromagnetic spectrum from 30 to 300 gigahertz (GHz). Radio waves in the EHF band have wavelengths from ten to one millimeter, so the EHF band is also called the millimeter wave band. Radiation in the EHF band is called millimeter waves (mmWave). Cellular network technology has developed in stages that are referred to as generations (G). Cellular communications have expanded into multiple communication bands and modulation schemes through the evolution of the telecommunications standard from first generation (1G), second generation (2G), third (3G), fourth generation (4G), and now fifth generation (5G). 5G communication uses a communication band or frequency spectrum in what is also referred to as millimeter wave bands (24-86 GHz).

In one or more embodiments, the present disclosure addresses concurrent transmission resulting from a dual connection of a 4G and a 5G RAT. In the recent past, cellular data service has been provided in part by a third generation (3G) RAT referred to as Universal Mobile Telecommunications Service (UMTS). Fourth generation (4G) RAT of evolved UTMS radio access (E-UTRA), referred to as LTE, has largely replaced 3G UMTS for broadband, packet-based transmission of text, digitized voice, video, and multimedia. A fifth generation (5G) RAT, referred to as fifth generation new radio (5G NR), is being deployed to at least augment capabilities of 4G LTE with a yet higher capability of data transfer.

5G non-standalone (NSA) mode is an option for 5G NR deployment. NSA mode is also referred to as evolved UTMS radio access network and new radio dual connectivity (ENDC). Unlike previously deployed RATs, ENDC actually utilizes two types of RATs at the same time. The 5G NSA mode depends on the control plane of an existing LTE network for connectivity control signaling. An LTE network can also be the sole RAT in 5G NSA mode that provides data transfer service. Alternatively, the LTE network (e.g., eNB 129) can signal for augmentation by, or sole reliance on, 5G NR (e.g., gNB 132) for data transfer services. In one or more embodiments, eNB 129 is the master node and gNB 132 is the secondary node. Communication devices 100 may remain connected to both 4G LTE and 5G NR or remain connected to just 4G LTE. The present disclosure addresses the IMD that can occur during dual connection. In addition, the present disclosure addresses IMD that can occur during other types of concurrent transmission.

Data storage subsystem 108 of communication device 100 includes data storage device(s) 142. Controller 101 is communicatively connected, via system interlink 143, to data storage device(s) 142. Data storage subsystem 108 provides nonvolatile storage that is accessible by controller 101. For example, data storage subsystem 108 can provide a large selection of other applications 144 that can be loaded into device memory 106. In one or more embodiments, data storage device(s) 142 can include hard disk drives (HDDs), optical disk drives, and/or solid state drives (SSDs), etc. Data storage subsystem 108 of communication device 100 can include removable storage device(s) (RSD(s)) 145, which is received in RSD interface 146. Controller 101 is communicatively connected to RSD 145, via system interlink 143 and RSD interface (I/F) 146. In one or more embodiments, RSD 145 is a non-transitory computer program product or computer readable storage device. Controller 101 can access RSD 145 to provision communication device 100 with program code, such as antenna selection application 103 and other applications 144. When executed by controller 101, the program code causes or configures communication device 100 to provide the functionality described herein.

I/O subsystem 110 includes proximity sensor 148, image capturing device 149, and range finder 150. I/O subsystem 110 also includes user interface device(s) 151 having one or more of display 152, touch/haptic controls 153, microphone 154, and audio output device(s) 155. I/O subsystem 110 also includes I/O controller 156, which connects to peripheral devices 157 external to housing 158 of communication device 100. One or more of the devices within I/O subsystem 110 can be used to detect proximity to person 127.

Controller 101 includes processor subsystem 160, which includes one or more central processing units (CPUs), depicted as data processor 161. Processor subsystem 160 can include one or more digital signal processors 162 that are integrated with data processor 161 or are communicatively coupled to data processor 161. Data processor 161 is communicatively coupled, via system interlink 143, to device memory 106. In one or more embodiments, controller 101 of communication device 100 is communicatively coupled via system interlink 143 to communication subsystem 102, data storage subsystem 108, and input/output subsystem 110. System interlink 143 represents internal components that facilitate internal communication by way of one or more shared or dedicated internal communication links, such as internal serial or parallel buses. As utilized herein, the term "communicatively coupled" means that information signals are transmissible through various interconnections, including wired and/or wireless links, between the components. The interconnections between the components can be direct interconnections that include conductive transmission media or may be indirect interconnections that include one or more intermediate electrical components. Although certain direct interconnections (interlink 143) are illustrated in FIG. 1, it is to be understood that more, fewer, or different interconnections may be present in other embodiments.

Controller 101 controls the various functions and/or operations of communication device 100. These functions and/or operations include, but are not limited to including, application data processing, communication with other electronic devices, navigation tasks, and signal processing. In one or more alternate embodiments, communication device 100 may use hardware component equivalents for application data processing and signal processing. For example, communication device 100 may use special purpose hardware, dedicated processors, general purpose computers, microprocessor-based computers, micro-controllers, optical computers, analog computers, dedicated processors and/or dedicated hard-wired logic.

Device memory 106 includes applications such as antenna selection application 103, communication application 164, and other application(s) 144. Device memory 106 further includes operating system (OS) 165, firmware interface 166, such as basic input/output system (BIOS) or Uniform Extensible Firmware Interface (UEFI), and firmware 167. Device memory 106 includes data 168 used by communication application 164 and other application(s) 144. Device memory 106 includes antenna communication band/isolation/gain data 169, intermodulation distortion/specific absorption rate/power density (IMD/SAR/PD) data 170, and quality metric weights data 171 used by antenna selection application 103. Processor subsystem 160 of controller 101 executes program code to provide operating functionality of communication device 100. These software and/or firmware modules have varying functionality when their corresponding program code is executed by processor subsystem 160 or secondary processing devices within communication device 100. Processor subsystem 160 of controller 101 can execute program code of communication application 164 to communicate with packet core 128.

Various pairs of first antennas 113a-113n and second antennas 114a-114m are more or less susceptible to IMD due to factors such as close proximity increasing the strength of an inferring signal. Another factor that increases susceptibility to IMD is having a transmission path to an antenna that operates at a particular frequency that coincides with a transmission from another antenna. Bandpass filters to exclude other frequencies would not filter the transmission from the other antenna that is within the passband. Due to proximity and imperfect isolation to particular transmission frequencies, internal transmissions 185 can couple between various pairs of first antennas 113a-113n and second antennas 114a-114m. Selection of particular pairs of first antennas 113a-113n and second antennas 114a-114m can mitigate effects of internal transmissions 185 that cause IMD.

In addition to mitigating effects of IMD, one concern with communications at millimeter-wave frequencies is that human tissues, such as skin, bone, muscle, and fat, are very lossy. For example, hand absorption can reduce peak gain of a millimeter-wave antenna array by 12 dB when the hand is around 5 millimeters from the antenna array. Accordingly, power savings can be realized if antenna arrays that are blocked by lossy objects are not used for high-power communications. Additionally, some regulatory entities specify power limitations on radio frequency (RF) transmissions.

Conventionally, various sensors such as capacitive, touch, and infrared (top hat) proximity sensors have been used for hand detection to avoid using antenna elements that are blocked or shadowed. However, due to the increase in antenna elements needed for communicating at millimeter-wave frequencies, the number of sensors needed for accurate hand detection may be impractical from control, management, power consumption, and cost perspectives. In such cases, determining object position can be based on determining mutual coupling values ("MCVs") for pairs of the antenna arrays. An object's proximity to an antenna array generally affects one or more MCVs for one or more pair of antenna arrays. An object can be any object that interferes with transmissions. An MCV is a quantitative measure of signal strength, or more specifically, how much of a signal transmitted by a transmitting antenna element is received by a receiving antenna element. Accordingly, an MCV can indicate an efficiency of a signal transmitted, which is indicative of whether or not an antenna is shadowed.

Figure 2:
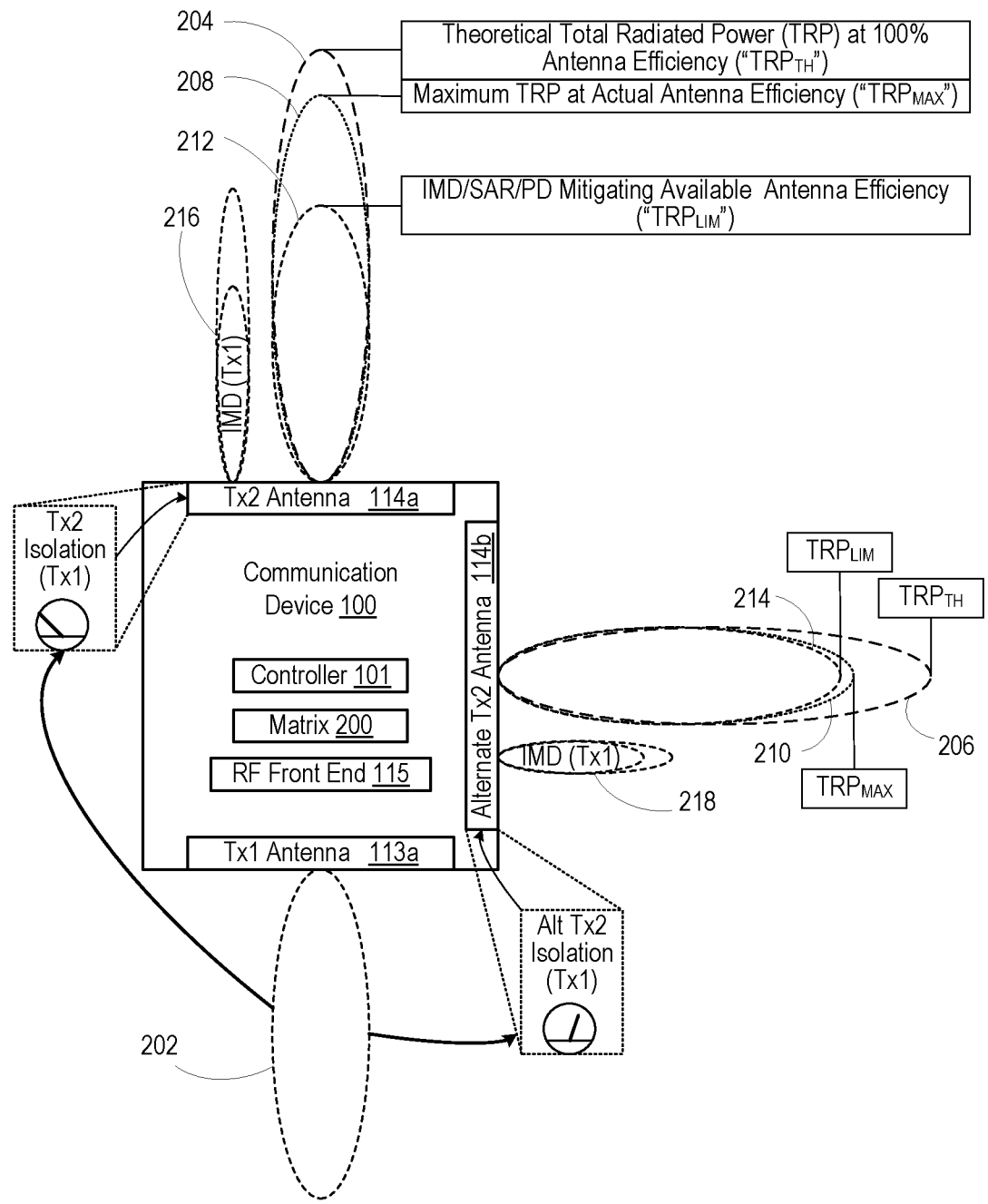
FIG. 2 is a simplified functional block diagram of an example communication device having a radio frequency (RF) front end and an antenna subsystem, according to one or more embodiments.

FIG. 2 depicts a simplified functional block diagram of example RF front end 115 and antenna subsystem 104 of communication device 100. For clarity, antenna selection is confined to selecting one of second transmit antenna 114a ("Tx2") and alternate second transmit antenna 114b to concurrently transmit with first antenna 113a having a fixed transmission power. Controller 101 optimizes transmission performance of communication device 100 by using pre-characterized data and/or sensors to select one of second antennas 114a-114b. Controller 101 identifies antenna efficiencies or gains, isolations, and SAR/PD performance between all antennas 113a, 114a-114b on communication device 100 based in part on communication band(s) that are to be transmitted. In one or more embodiments, total radiated power (TRP) and intermodulation distortion (IMD) are calculated from the known efficiencies and isolations. Matrix 200 of performance for each potential antenna combination is generated. The combination of one of second transmit antennas 114a-114b with first antenna 113a is selected that results in optimal TRP for a given set of self-desensitization/emissions/RF radiation exposure criteria.

As an example of optimizing performance based on antenna selection, first antenna 113a transmits first transmission signal 202. Based on the maximum transmit power available, second antennas 114a-114b both have theoretical TRP 204, 206 if 100% efficient ("$TRP_{TH}$") that are the same magnitude. Second antenna 114a has an optimal Tx2 antenna gain of −5 dB, and alternate second antenna 114b has optimal Tx2 antenna gain of −8 dB. Maximum TRP ("TRPmax") 208 of second antenna 114a is thus greater than TRPmax 210 of alternate second antenna 114b. Instead of selecting an antenna based solely on antenna efficiency, the present disclosure also considers antenna isolation. Second antenna 114a has an isolation to the first antenna 113a that is 15 db. By contrast, the alternate second antenna 114b has an isolation to the first antenna 113b that is 21 dB. Given that 22 dB of antenna isolation is required to achieve acceptable MSD for mitigating IMD/SAR/PD, second antenna 114a requires a limitation of a 7 dB cutback to an available TRP ("$TRP_{LIM}$") 210. The 7 db cutback reduces IMD product 216 from second antenna 114a to an acceptable level. Mitigating IMD product 218 for IMD/SAR/PD for alternate second antenna 114b requires a cutback of only 1 dB to achieve an available TRP ("$TRP_{LIM}$") 212. IMD product 214 from alternate second antenna 114b has an almost acceptable magnitude prior to cutback. The intrinsic antenna efficiency of 3 dB of second antenna 114a over alternate second antenna 114b is less important in this illustrative scenario than the better isolation of alternate second antenna 114b due to disparate isolation characteristics. Due to the different cutback requirements to mitigate IMD/SAR/PD, available TRP 212 of alternate second antenna 114b is greater than available TRP 210 of second antenna 114a even though second antenna 114a has better antenna efficiency at the selected communication band.

Figure 3:
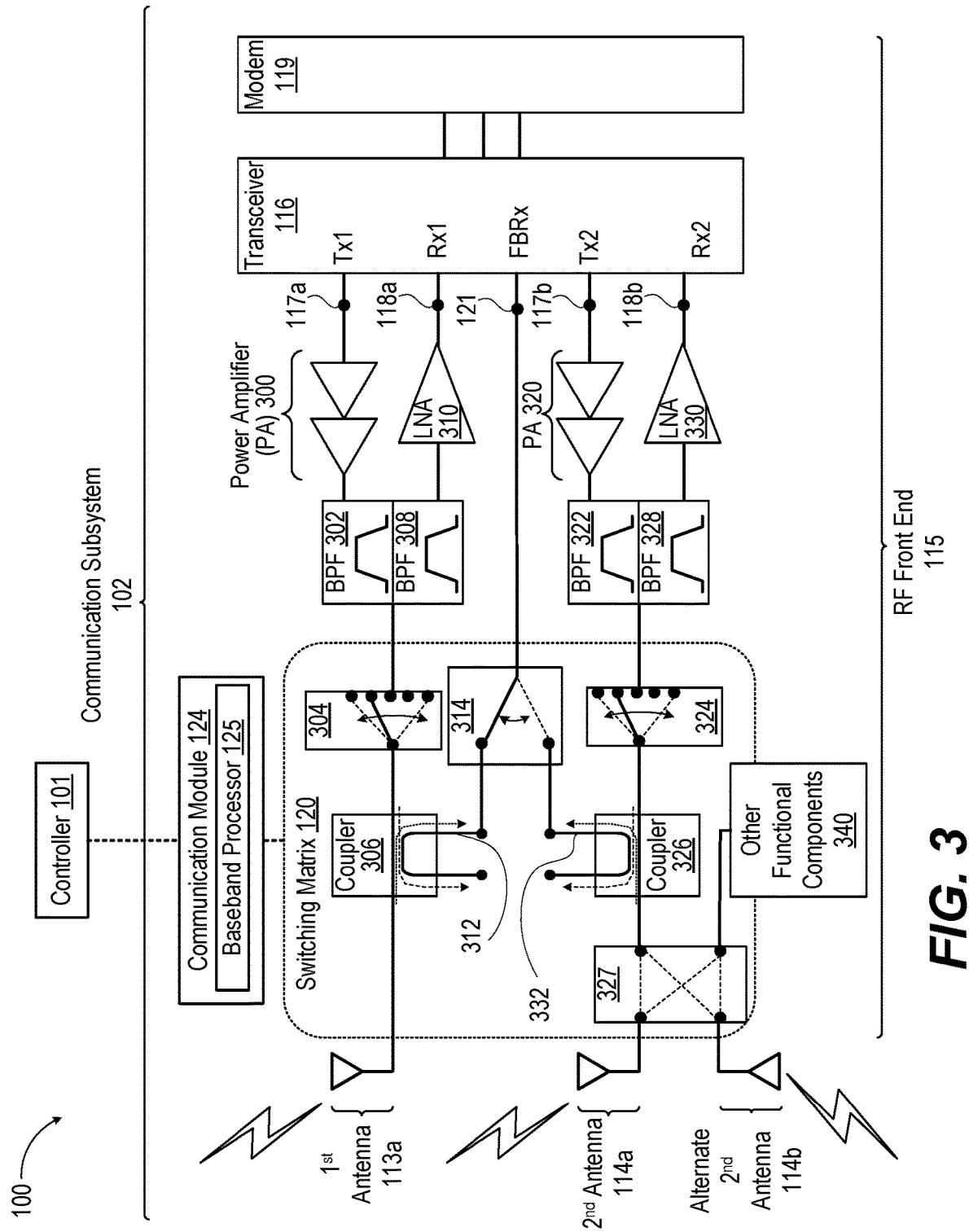
FIG. 3 is a diagram of an example communication device having a first antenna, a second antenna, and an alternate second antenna annotated for different antenna transmission performance, according to one or more embodiments.

FIG. 3 depicts a diagram of communication subsystem 102 of communication device 100, which for clarity is limited to three antennas: first antenna 113a, second transmit antenna 114a, and alternate second transmit antenna 114b. When transmitting, first transmitter 117a of transceiver 116 is electrically coupled to power amplifier 300, first transmit (Tx) bandpass filter (BPF) 302, first switch 304, first differential coupler 306, and first antenna 113a. When receiving, first antenna 113a is electrically coupled to first differential coupler 306, first switch 304, first receive (Rx) BPF 308, first low noise amplifier (LNA) 310 and first receiver 118a of transceiver 116. Modem 119 is communicatively coupled to transceiver 116 as part of transmission and reception paths. Return sensing path 312 of first differential coupler 306 is selectively coupled through feedback switch 314 to feedback receiver ("FBRx") 121.

Two-by-two switch 327 is configurable in at least a first and a second configuration to enable switching, by controller 101, of transmitter 117b to use one of second antenna 114a and alternate second antenna 114b. In the first configuration, two-by-two switch 327 communicatively couples alternate second antenna 114b to functional components 340 and communicatively couples second antenna 114a to transceiver 116. In one or more embodiments, the first configuration of two-by-two switch 327 is a normal configuration that assigns a priority transmission path from second transmitter 117b to the most efficient antenna (second antenna 114a). In the first configuration, second transmitter 117b of transceiver 116 is electrically coupled, when transmitting, to power amplifier 320, second Tx BPF 322, second switch 324, second differential coupler 326, two-by-two switch 327, and second antenna 114a. While second receiver 118b is receiving, second antenna 114a in the first configuration is electrically coupled to two-by-two switch 327, second differential coupler 326, second switch 324, second Rx BPF 328, second LNA 330 and second receiver 118b of transceiver 116. Modem 119 is communicatively coupled to transceiver 116 as part of transmission and reception paths. Return sensing path 332 of second differential coupler 326 is selectively coupled through feedback switch 314 to FBRx 121.

In the first configuration, two-by-two switch 327 communicatively couples alternate second antenna 114b to functional components 340 and communicatively couples second antenna 114a to transceiver 116. In one or more embodiments, the first configuration of two-by-two switch 327 is a normal configuration that assigns a priority transmission path from second transmitter 117b to the most efficient antenna (second antenna 114a).

According to aspects of the present disclosure, to improve performance of transmission by second transmitter 317b, two-by-two switch 327 can also be configured in the second configuration. Two-by-two switch 327 communicatively couples second antenna 114a to functional components 340 and communicatively couples alternate second antenna 114b to transceiver 116. In the second configuration of two-by-two switch 327, second transmitter 117b of transceiver 116 is electrically coupled, when transmitting, to power amplifier 320, second Tx BPF 322, second switch 324, second differential coupler 326, two-by-two switch 327, and alternate second antenna 114b. While second receiver 118b is receiving, alternate second antenna 114b in the second configuration is electrically coupled to two-by-two switch 327, second differential coupler 326, second switch 324, second Rx BPF 328, second LNA 330 and second receiver 118b of transceiver 116. In one or more embodiments, switching other functional components 340 from use of alternate second antenna 114b to second antenna 114a can have no significant detriment overall for communication performance of communication device 100. For example, other functional components 340 may be receiving or operating in a transmit frequency band that operates satisfactorily via second antenna 114a.

Figure 4A:
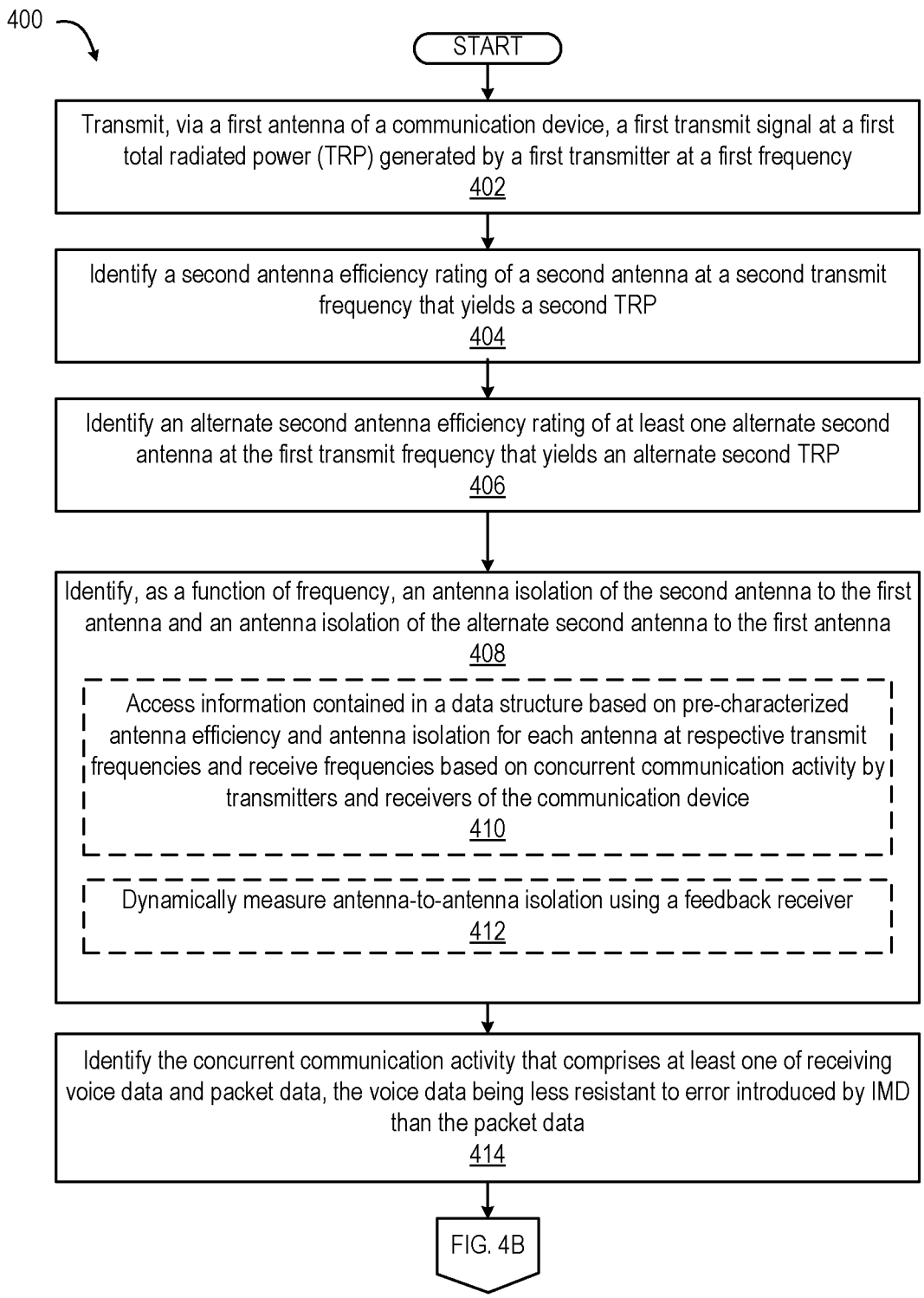
FIGS. 4A-4B (FIG. 4) depict a flow diagram of a method for optimizing performance of multiple transmitters that concurrently transmit, according to one or more embodiments.

FIG. 4 depicts a flow diagram of method 400 for optimizing performance of multiple transmitters that concurrently transmit. In one or more embodiments, controller 101 enables communication device 100 (FIG. 1) to perform method 400 by the execution of code, such as antenna selection application 103 (FIG. 1). In one or more embodiments, components referenced in method 400 are performed by components having the same name described with regard to FIGS. 1-3. With reference to FIG. 4A, method 400 includes transmitting, via a first antenna of a communication device, a first transmit signal at a first total radiated power (TRP) (block 402). The first transmit signal is generated by a first transmitter at a first frequency. Method 400 includes identifying a second antenna efficiency rating of a second antenna at a second transmit frequency that yields a second TRP (block 404). Method 400 includes identifying an alternate second antenna efficiency rating of at least one alternate second antenna at the first transmit frequency that yields an alternate second TRP (block 406). Method 400 includes identifying, as a function of frequency, an antenna isolation level of the second antenna to the first antenna and an isolation level of the alternate second antenna to the first antenna (block 408). For clarity, only two second antennas 114a, 114b (FIG. 3) are described herein. However, in one or more embodiments, evaluations of a larger number of combinations first antennas 113a-113n and second antennas 114a-114m (FIG. 1) can be evaluated for possible concurrent transmission use. The antenna isolation can also be evaluated for an antenna being used to receive to determine an appropriate power level for acceptable IMD that does not desense the receiver. Method 500 (FIG. 5A-5B) described below is an example of a broader evaluation. In one or more embodiments, the other antennas are first antennas 113a and second antennas 114a-114b (FIG. 2). The other antennas can communicate in communication bands that support wireless local access network (WLAN) communication, LTE cellular communication, 5G NR cellular communication, personal access network (PAN) communication, etc. In one or more embodiments, method 400 includes identifying the respective antenna isolation level by accessing information contained in a data structure (block 410). The data structure presents antenna selection data based on pre-characterized antenna efficiency and antenna isolation for each antenna at respective transmit frequencies and receive frequencies based on the concurrent communication activity of the transmitters and receivers of the communication device. In one or more alternate embodiments, method 400 includes identifying the respective antenna isolation level by dynamically measuring antenna-to-antenna isolation using a feedback receiver (block 412).

In one or more embodiments, method 400 includes identifying concurrent communication activity of transmitter(s) and receiver(s) of the communication device. In one or more embodiments, method 400 includes identifying the concurrent communication activity that comprises at least one of receiving voice data and packet data, the voice data being less resistant to error introduced by IMD than the packet data (block 414).

Figure 4B:
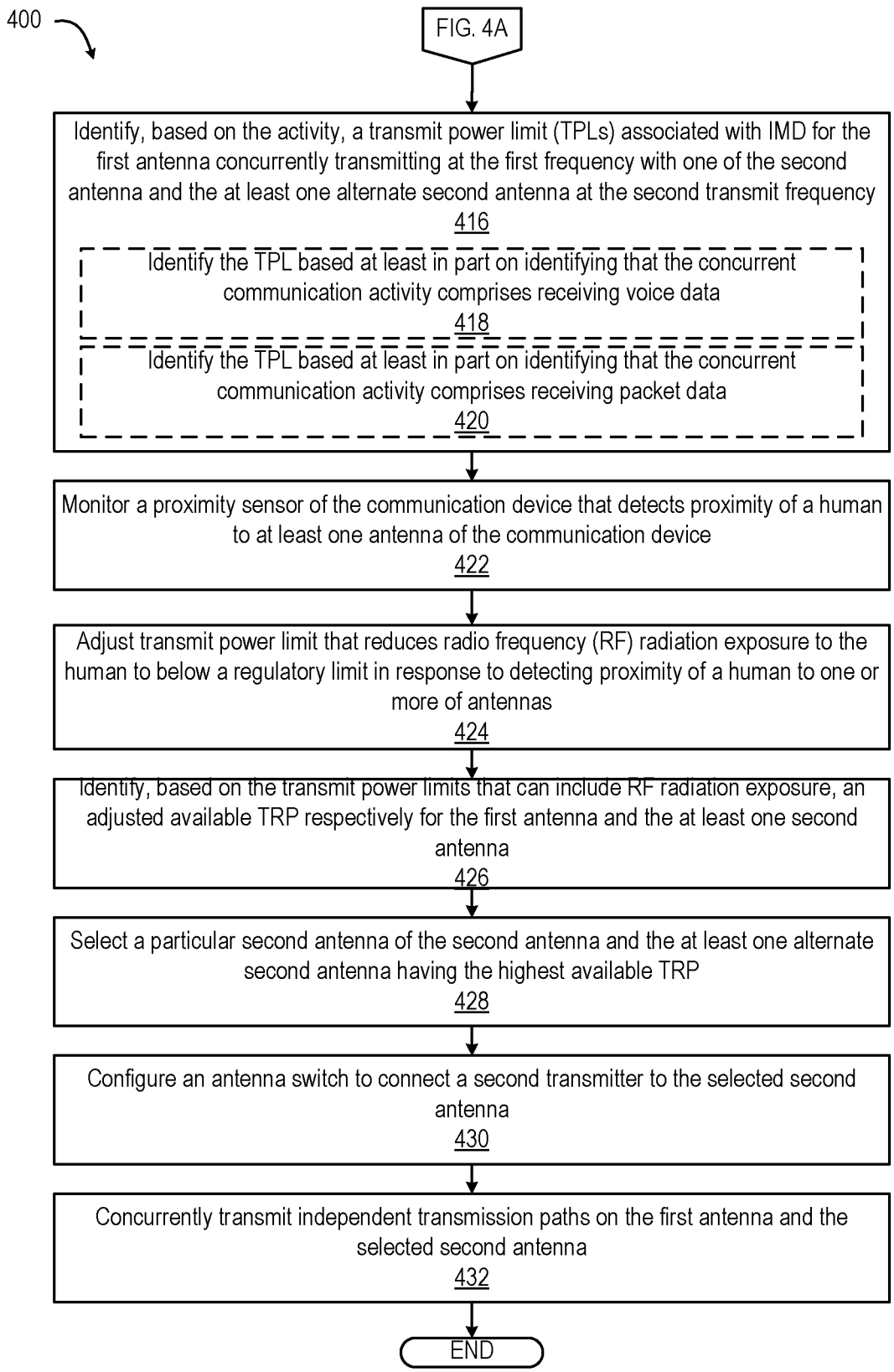

With reference to FIG. 4B, method 400 includes identifying, based on the concurrent communication activity by the transmitters and receivers of the communication device, a transmit power limit (TPL) associated with IMD for the first antenna concurrently transmitting at the first frequency with the TPL of one of the second antenna and the at least one alternate second antenna transmitting at the second transmit frequency (block 416). The transmit power limit reduces IMD of a transmit signal from one antenna being amplified in another antenna of the communication device that could otherwise cause one of: (i) spurious emission above a regulatory limit; and (ii) de-sensing of at least one receiver among the at least one receiver. In one or more embodiments, method 400 includes the TPL based at least in part on identifying that the concurrent communication activity comprises receiving packet data (block 418). In one or more embodiments, method 400 includes identifying TPL based at least in part on identifying that the concurrent communication activity comprises receiving voice data (block 420).

In one or more embodiments method 400 includes monitoring a proximity sensor of the communication device that detects proximity of a human to at least one antenna of the communication device (block 422). Method 400 includes adjusting transmit power limit that reduces RF radiation exposure to the human to below a regulatory limit in response to detecting proximity of a human to one or more of antennas (block 424). Method 400 includes identifying, based on the transmit power limits that can include mitigation for RF radiation exposure, an adjusted available TRP respectively for the first antenna and the at least one second antenna (block 426). The adjustment for RF radiation exposure may be applicable to no antennas or only a subset of antennas. For example, proximity to an antenna transmitting in mmWave may only be applicable to one antenna array module. The adjustment for RF radiation exposure may be applicable to all transmitting antennas that are additively contributing to SAR. The adjusted available TRP reduces RF radiation exposure to the human to below a regulatory limit in addition to maintaining IMD below a specified level.

Method 400 includes selecting, from among the second antenna and the at least one alternate second antenna, a particular second antenna having the highest available TRP (block 428). Method 400 includes configuring an antenna switch to connect a second transmitter to the selected particular second antenna (block 430). Method 400 includes concurrently transmitting independent transmission paths on the first antenna and the selected, particular second antenna (block 432). Then method 400 ends.

Figure 5A:
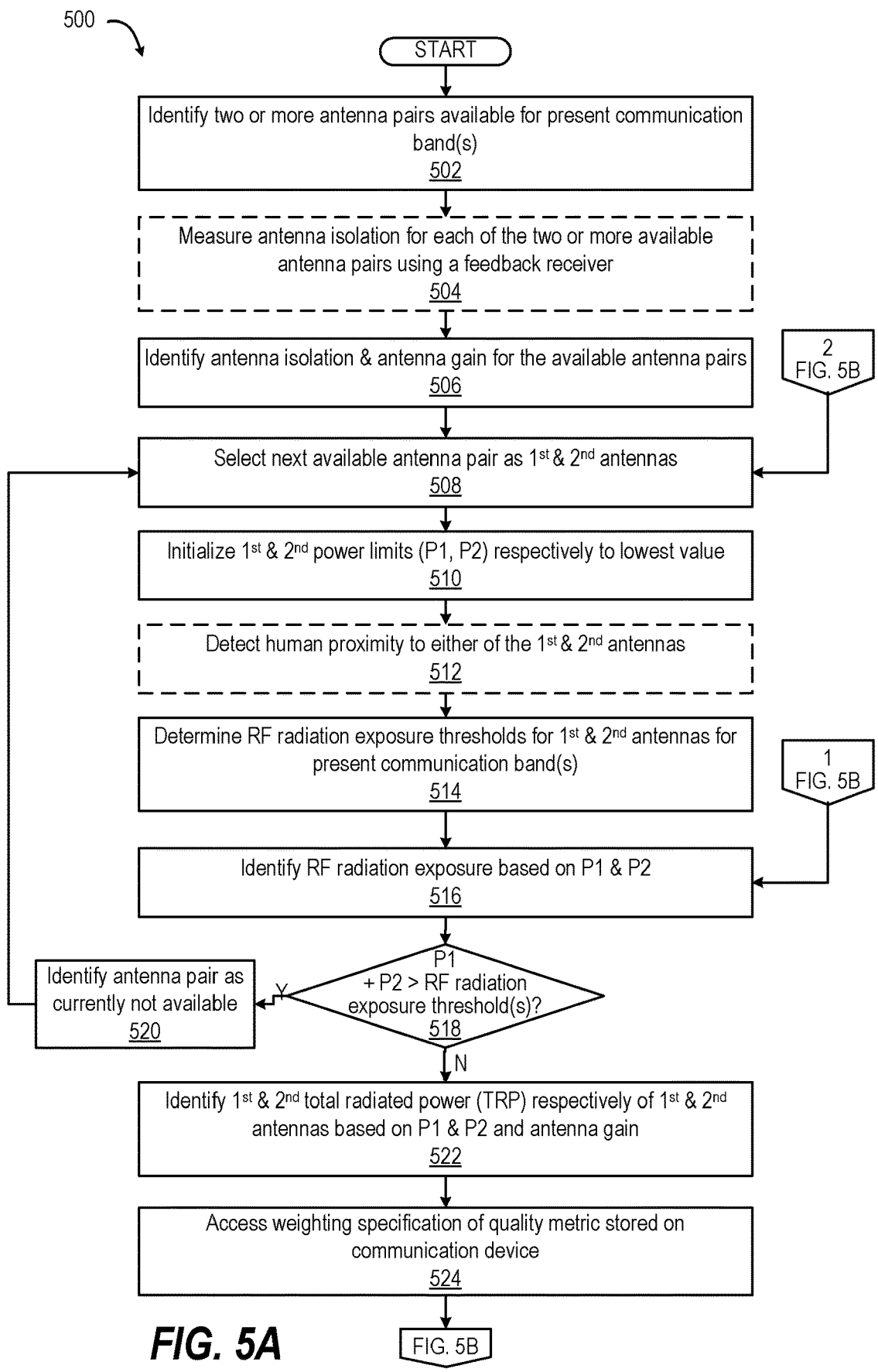
FIGS. 5A-5B (FIG. 5) depict a flow diagram of a method for optimizing performance using a quality metric for multiple transmitters that concurrently transmit, according to one or more embodiments.
Figure 5B:
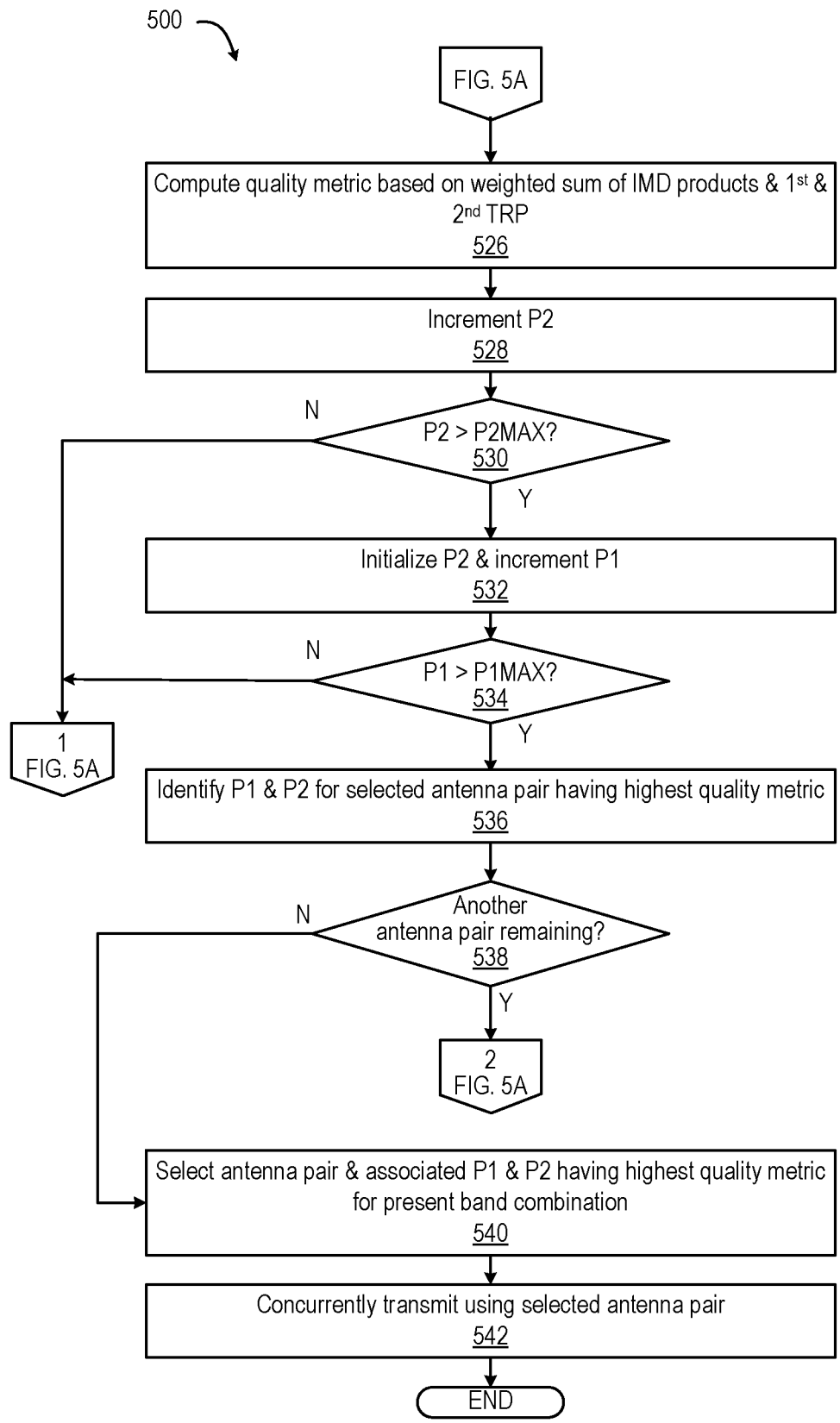

FIGS. 5A-5B (FIG. 5) depict a flow diagram of method 500 for optimizing performance using a quality metric of multiple transmitters that concurrently transmit. In one or more embodiments, controller 101 enables communication device 100 (FIG. 1) to perform method 500 by the execution of code, such as antenna selection application 103 (FIG. 1). In one or more embodiments, components referenced in method 500 are performed by components having the same name described with regard to FIGS. 1-4. With reference to FIG. 5A, method 500 includes identifying two or more antenna pairs available for concurrent transmitting for the present communication band(s) (block 502). In one or more embodiments, the present communication band(s) include use of two different transmit frequencies. For example, one present communication band supports LTE data or voice services. Another present communication band supports 5G NR service. In one or more embodiments, the present communication band(s) include two transmission paths that are using the same frequency. The communication device can use spatial diversity or code division multiplexing to enable separate receiving at the intended receiver. In one or more embodiments, method 500 includes measuring antenna isolation for each of the two or more available antenna pairs using a feedback receiver (block 504). Method 500 includes identifying antenna isolation and antenna gain for the available antenna pairs (block 506). Some or all of the information about the antennas can be pre-characterizations that are empirically or deterministically established and stored in a data structure on the communication device. Some of the values can depend on concurrent communication activity of the communication device. For example, relative positions of the antennas can depend on whether the communication device is open or closed, attached to a charging device, attached or detached from a modular peripheral device, etc.

Method 500 includes selecting a next available pair as first and second antennas (block 508). Method 500 includes initializing first and second power limits (P1, P2), respectively, to a lowest value (block 510). In one or more embodiments, method 500 includes using the same lowest value and a same highest value that define a range of power limits for evaluation of possible P1 and P2. In one or more embodiments, the lowest value is zero (0). In one or more embodiments, the lowest value is set to a non-zero value that is a practical TPL for cellular communication. In one or more embodiments, the highest value is based on a highest transmit power achievable by the communication device. In one or more embodiments, the highest value is based on a highest transmit power permissible by applicable regulations for the communication device. In one or more embodiments, method 500 includes detecting human proximity to either of the first and the second antennas (block 512). In one or more alternate embodiments, human proximity can be inferred from contextual information available to the controller. Method 500 includes determining RF radiation exposure threshold for present communication band(s) (block 514). Method 500 includes identifying additive RF radiation exposure based on P1 and P2 (block 516). A determination is made, in decision block 518, whether the additive power of the first and the second power limits is greater than the RF radiation exposure threshold. In response to determining that the additive power is greater than the RF radiation exposure threshold, method 500 includes identifying the antenna pair as currently not available (block 520). If the first evaluation point with P1 and P2 at their lowest values are not within a RF radiation exposure threshold, then no power setting for the selected pair of antennas is available without exceeding the RF radiation exposure threshold. Then, method 500 returns to block 508. In response to determining that the additive power is less than or equal to the RF radiation exposure threshold, method 500 includes identifying first and second TRP respectively of the first and the second antennas based on the first and second power limits (P1, P2) and the antenna efficiency or gain (block 522). Method 500 includes accessing weighting specification of quality metric stored on the communication device (block 524).

With reference to FIG. 5B, method 500 includes computing a quality metric based on the weighted sum of IMD products and the first and the second TRP (block 526). Method 500 includes incrementing second power limit P2 (block 528). A determination is made, in decision block 530, whether P2 is greater than a maximum second power limit (P2MAX). In response to determining that P2 is greater than P2MAX, method 500 returns to block 516. In response to determining that P2 is less than or equal to P2MAX, method 500 includes initializing P2 to the lowest value and incrementing P1 (block 532). A determination is made, in decision block 534, whether P1 is greater than a maximum first power limit (P1MAX). In response to determining that P1 is greater than P1MAX, method 500 returns to block 516. In response to determining that P1 is less than or equal to P1MAX, method 500 includes identifying the P1 and the P2 for the selected antenna pair that has the highest quality metric (block 536). The best P1 and P2 based on the quality metric for that pair of first and second antennas is stored for later comparison after evaluation is completed for all pairs of first and second antennas. A determination is made, in decision block 538, whether another antenna pair is remaining. In response to determining that another antenna pair is remaining, method 500 returns to block 508. In response to determining that there is no other antenna pair remaining (i.e., the outer loop is complete), method 500 includes selecting the antenna pair and the associated P1 and P2 having the highest quality metric for the present combination of communication band(s) (block 540). Method 500 includes concurrently transmitting using the selected antenna pair and associated P1 and P2 (block 542). Then, method 500 ends.

In each of the above flow charts presented herein, certain steps of the methods can be combined, performed simultaneously or in a different order, or perhaps omitted, without deviating from the spirit and scope of the described innovation. While the method steps are described and illustrated in a particular sequence, use of a specific sequence of steps is not meant to imply any limitations on the innovation. Changes may be made with regards to the sequence of steps without departing from the spirit or scope of the present innovation. Use of a particular sequence is therefore, not to be taken in a limiting sense, and the scope of the present innovation is defined only by the appended claims.

Aspects of the present innovation are described above with reference to flowchart illustrations and/or block diagrams of methods, apparatus (systems) and computer program products according to embodiments of the innovation. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

As will be appreciated by one skilled in the art, embodiments of the present innovation may be embodied as a system, device, and/or method. Accordingly, embodiments of the present innovation may take the form of an entirely hardware embodiment or an embodiment combining software and hardware embodiments that may all generally be referred to herein as a "circuit," "module" or "system."

While the innovation has been described with reference to exemplary embodiments, it will be understood by those skilled in the art that various changes may be made, and equivalents may be substituted for elements thereof without departing from the scope of the innovation. In addition, many modifications may be made to adapt a particular system, device or component thereof to the teachings of the innovation without departing from the essential scope thereof. Therefore, it is intended that the innovation not be limited to the particular embodiments disclosed for carrying out this innovation, but that the innovation will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the innovation. As used herein, the singular forms "a", "an" and "the" are intended to include the plural forms as well, unless the context clearly indicates otherwise. It will be further understood that the terms "comprise" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present innovation has been presented for purposes of illustration and description but is not intended to be exhaustive or limited to the innovation in the form disclosed. Many modifications and variations will be apparent to those of ordinary skill in the art without departing from the scope and spirit of the innovation. The embodiments were chosen and described in order to best explain the principles of the innovation and the practical application, and to enable others of ordinary skill in the art to understand the innovation for various embodiments with various modifications as are suited to the particular use contemplated.

What is claimed is:

1. A communication device comprising:
   first transmitter that transmits at a first frequency;
   a first antenna electrically coupled to the first transmitter to transmit a first transmit signal at a first total radiated power (TRP);
   a second transmitter that generates a transmit signal at a second frequency;
   a second antenna having a second antenna efficiency rating at the second transmit frequency that yields a second TRP, the second antenna having a first antenna isolation level transmitting at the second transmit frequency to the first antenna transmitting at the first frequency;
   at least one alternate second antenna each having an alternate second antenna efficiency rating at the second transmit frequency that yields an alternate second TRP, the at least one alternate second antenna having a second antenna isolation level transmitting at the second transmit frequency to the first antenna transmitting at the first frequency;
   an antenna switch that electrically connects the second transmitter to one of the second antenna and the at least one alternate second antenna;
   a controller communicatively coupled to the first and the second transmitter, and the antenna switch to optimize performance of antenna selection during concurrent transmission, and which:
   monitors concurrent communication activity of the first and the second transmitter;
   identifies, based on the concurrent communication activity, respective transmit power limits associated with intermodulation distortion (IMD) for the first antenna transmitting at the first transmit frequency and one of the second antenna based on the first antenna isolation level and the at least one alternate second antenna based on the second antenna isolation level, both transmitting at the second transmit frequency;
   identifies, based in part on the transmit power limits, available TRP, respectively, for the second antenna and the at least one alternate second antenna; and
   configures the antenna switch to connect the second transmitter to one of the second antenna and the at least one alternate second antenna having the highest available TRP.

2. The communication device of claim 1, wherein:
   at least one receiver; and
   the transmit power limit reduces IMD of a transmit signal from one antenna from being amplified in another antenna, wherein, without the transmit power limit, the IMD causes one of: (i) spurious emission above a regulatory limit; and (ii) de-sensing of the at least one receiver of the communication device.

3. The communication device of claim 2, further comprising a proximity sensor communicatively coupled to the controller and that detects proximity of a human to at least one antenna of the communication device, wherein:
   the concurrent communication activity comprises detecting proximity of a human to at least one of the antennas; and
   the transmit power limit reduces radio frequency (RF) radiation exposure to the human to below a regulatory limit.

4. The communication device of claim 2, further comprising a user interface device communicatively coupled to the controller, wherein the controller:
   detects, via the user interface device, a user interaction that is indicative of human proximity; and
   identifies the transmit power limit that reduces radio frequency (RF) radiation exposure to the human to below a regulatory limit.

5. The communication device of claim 1, wherein the controller identifies the transmit power limit from information contained in a data structure based on pre-characterized antenna efficiency and antenna isolation for each antenna at respective transmit frequencies and receive frequencies that are indicated by the concurrent communication activity.

6. The communication device of claim 1, further comprising a feedback receiver, wherein the controller dynamically identifies the transmit power limit based on antenna isolation determined by measuring antenna-to-antenna isolation using the feedback receiver.

7. The communication device of claim 1, wherein the controller:
   identifies the concurrent communication activity that comprises at least one of receiving voice data and packet data, the voice data being less resistant to error introduced by intermodulation distortion (IMD) than the packet data;
   identifies a first transmit power limit for an antenna from among the second antenna and the at least one alternate second antenna based on identifying that the concurrent communication activity comprises receiving packet data; and
   identifies a second transmit power limit that is lower than the first transmit power limit for the antenna based on identifying that the concurrent communication activity comprises receiving voice data.

8. A method comprising:
- transmitting, via a first antenna of a communication device, a first transmit signal at a first total radiated power (TRP) generated by a first transmitter at a first frequency;
- identifying a second antenna efficiency rating of a second antenna at a second transmit frequency that yields a second TRP;
- identifying a first antenna isolation level of the second antenna transmitting at the second transmit frequency to the first antenna transmitting at the first frequency;
- identifying an alternate second antenna efficiency rating of at least one alternate second antenna at the first transmit frequency that yields an alternate second TRP;
- identifying a second antenna isolation level of the at least one alternate second antenna transmitting at the second transmit frequency to the first antenna transmitting at the first frequency;
- monitoring concurrent communication activity of the first transmitter and a second transmitter of the communication device that transmits at the second frequency;
- identifying, based on the concurrent communication activity, respective transmit power limits associated with intermodulation distortion (IMD) for the first antenna and one of the second antenna and the at least one alternate second antenna at the second transmit frequency based on the respective one of the first and the second antenna isolation levels;
- identifying, based in part on the transmit power limits, available TRP respectively for the second antenna and the at least one alternate second antenna; and
- configuring an antenna switch to connect the second transmitter to one of the second antenna and the at least one alternate second antenna having the highest available TRP.

9. The method of claim 8, wherein identifying the transmit power limit that reduces IMD of a transmit signal from one antenna being amplified in another antenna of the communication device, wherein, without the transmit power limit, the IMD causes one of: (i) spurious emission above a regulatory limit; and (ii) de-sensing of at least one receiver of the communication device.

10. The method of claim 9, further comprising:
- monitoring a proximity sensor of the communication device that detects proximity of a human to at least one antenna of the communication device, wherein:
- identifying the concurrent communication activity is based at least in part on detecting proximity of a human to one or more of antennas; and
- determining the transmit power limit that reduces radio frequency (RF) radiation exposure to the human to below a regulatory limit.

11. The method of claim 9, further comprising:
- detecting, via the user interface device, a user interaction that is indicative of human proximity; and
- identifying the transmit power limit that reduces radio frequency (RF) radiation exposure to the human to below a regulatory limit.

12. The method of claim 8, further comprising identifying the transmit power limit from information contained in a data structure based on pre-characterized antenna efficiency and antenna isolation for each antenna at respective transmit frequencies and receive frequencies that are indicated by the concurrent communication activity.

13. The method of claim 8, further comprising dynamically identifying the transmit power limit based on antenna isolation determined by measuring antenna-to-antenna isolation using a feedback receiver.

14. The method of claim 8, wherein identifying the transmit power limit comprises:
- identifying the concurrent communication activity that comprises at least one of receiving voice data and packet data, the voice data being less resistant to error introduced by intermodulation distortion (IMD) than the packet data;
- identifying a first transmit power limit for an antenna from among the second antenna and the at least one alternate second antenna based on identifying that the concurrent communication activity comprises receiving packet data; and
- identifying a second transmit power limit that is lower than the first transmit power limit for the antenna based on identifying that the concurrent communication activity comprises receiving voice data.

15. A non-transitory computer program product comprising:
- a computer readable storage device; and
- program code on the computer readable storage device that when executed by a processor associated with a communication device, the program code enables the communication device to provide the functionality of:
  - transmitting, via a first antenna of the communication device, a first transmit signal at a first total radiated power (TRP) generated by a first transmitter at a first frequency;
  - identifying a second antenna efficiency rating of a second antenna at a second transmit frequency that yields a second TRP;
  - identifying a first antenna isolation level of the second antenna transmitting at the second transmit frequency to the first antenna transmitting at the first frequency;
  - identifying an alternate second antenna efficiency rating of at least one alternate second antenna at the first transmit frequency that yields an alternate second TRP;
  - identifying a second antenna isolation level of the at least one alternate second antenna transmitting at the second transmit frequency to the first antenna transmitting at the first frequency;
  - monitoring concurrent communication activity of the first transmitter and a second transmitter of the communication device that transmits at the second frequency;
  - identifying, based on the concurrent communication activity, respective transmit power limits associated with intermodulation distortion (IMD) for the first antenna and one of the second antenna and the at least one alternate second antenna at the second transmit frequency based on the respective one of the first and the second antenna isolation levels;
  - identifying, based in part on the transmit power limits, available TRP respectively for the second antenna and the at least one alternate second antenna; and
  - configuring an antenna switch to connect the second transmitter to one of the second antenna and the at least one alternate second antenna having the highest available TRP.

16. The non-transitory computer program product of claim 15, wherein the program code enables the communication device to provide the functionality of identifying the transmit power limit that reduces IMD of a transmit signal from one antenna being amplified in another antenna of the communication device, wherein, without the transmit power limit, the IMD causes one of: (i) spurious emission above a regulatory limit; and (ii) de-sensing of at least one receiver of the communication device.

17. The non-transitory computer program product of claim 16, wherein the program code enables the communication device to provide the functionality of detecting human proximity to at least one of antenna of the communication device based on at least one of: (i) a proximity sensor of the communication device; and (ii) user interaction with a user interface device of the communication device that is indicative of human proximity; and identifying the transmit power limit that reduces radio frequency (RF) radiation exposure to the human to below a regulatory limit.

18. The non-transitory computer program product of claim 15, wherein the program code enables the communication device to provide the functionality of identifying the transmit power limit from information contained in a data structure based on pre-characterized antenna efficiency and antenna isolation for each antenna at respective transmit frequencies and receive frequencies that are indicated by the concurrent communication activity.

19. The non-transitory computer program product of claim 15, wherein the program code enables the communication device to provide the functionality of dynamically identifying the transmit power limit based on antenna isolation determined by measuring antenna-to-antenna isolation using a feedback receiver.

20. The non-transitory computer program product of claim 15, wherein the program code enables the communication device to provide the functionality of:

identifying the concurrent communication activity that comprises at least one of receiving voice data and packet data, the voice data being less resistant to error introduced by intermodulation distortion (IMD) than the packet data;

identifying a first transmit power limit for an antenna from among the second antenna and the at least one alternate second antenna based on identifying that the concurrent communication activity comprises receiving packet data; and identifying a second transmit power limit that is lower than the first transmit power limit for the antenna based on identifying that the concurrent communication activity comprises receiving voice data.

* * * * *